United States Patent [19]

Carpenter, Jr.

[11] 4,180,698

[45] Dec. 25, 1979

[54] SYSTEM AND EQUIPMENT FOR ATMOSPHERICS CONDITIONING

[76] Inventor: Roy B. Carpenter, Jr., 17001 Bracewood Dr., Hacienda Heights, Calif. 91745

[21] Appl. No.: 822,218

[22] Filed: Aug. 5, 1977

Related U.S. Application Data

[63] Continuation-in-part of Ser. No. 651,922, Jan. 23, 1976, abandoned.

[51] Int. Cl.² ......................... H02G 13/00; H05F 3/00
[52] U.S. Cl. ........................................... 174/2; 174/6; 361/212; 361/220; 361/231
[58] Field of Search ....................... 174/2, 3, 4 R, 4 C, 174/6, 7; 307/145, 149; 361/117, 212, 215, 216, 220, 222, 230, 231, 233, 437

[56] References Cited

U.S. PATENT DOCUMENTS

| 1,617,788 | 2/1927 | Baldwin et al. | 174/2 |
| 1,678,539 | 7/1928 | Ticehurst | 174/2 |
| 1,743,526 | 1/1930 | Cage | 174/2 |
| 1,916,335 | 7/1933 | Schaeffer | 174/2 |

FOREIGN PATENT DOCUMENTS

| 138190 | 7/1934 | Austria | 361/231 |
| 264571 | 9/1913 | Fed. Rep. of Germany | 361/231 |
| 294183 | 6/1929 | United Kingdom | 174/2 |
| 338268 | 11/1930 | United Kingdom | 174/2 |

Primary Examiner—Laramie E. Askin

[57] ABSTRACT

A system and equipment for the preventative protection of objects located on the surface of the earth from the effects of atmospherics.

3 Claims, 14 Drawing Figures

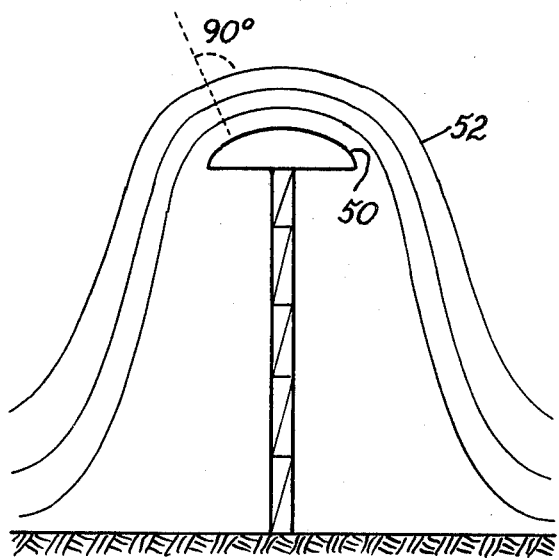
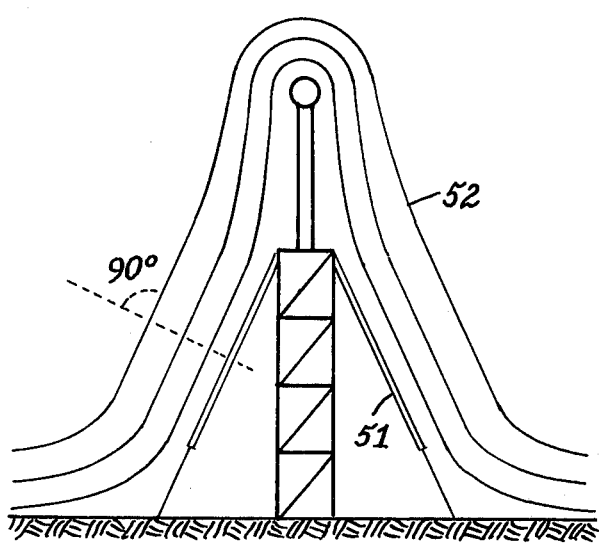
Fig. 4.   Fig. 5.
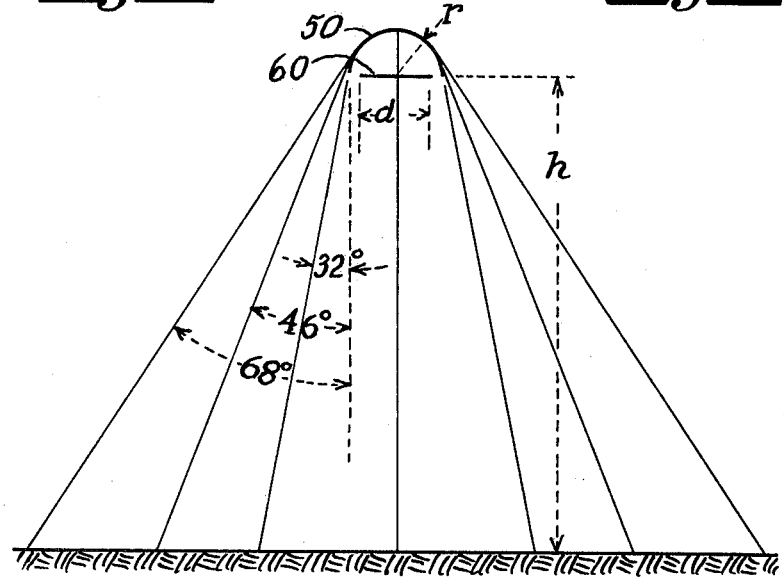
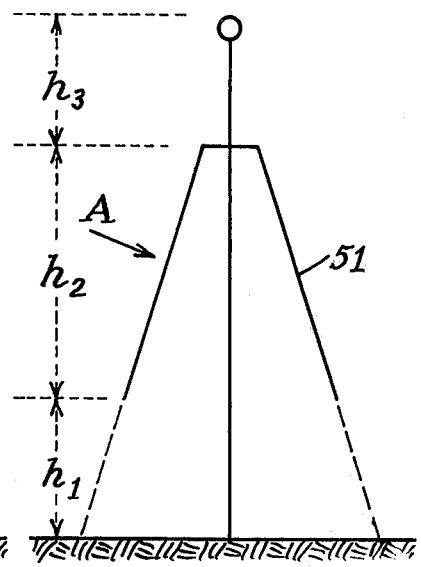
Fig. 6.   Fig. 7.
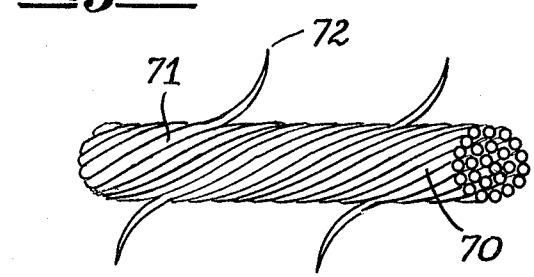
Fig. 11.
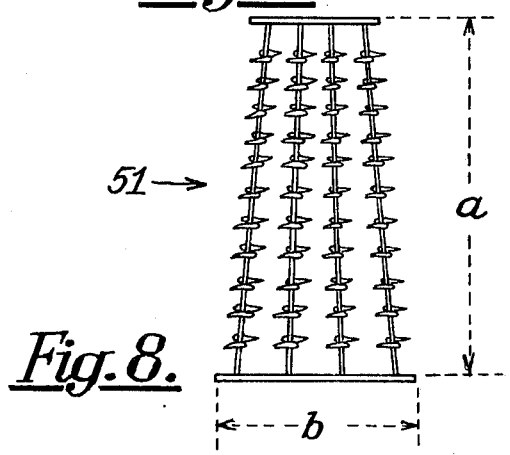
Fig. 8.

SYSTEM AND EQUIPMENT FOR ATMOSPHERICS CONDITIONING

This application is a continuation-in-part of my copending application Ser. No. 651,922 filed Jan. 23, 1976, now abandoned.

DESCRIPTION OF PRIOR ART

The subjects of this invention are improved systems and elements of equipment utilizing various basic teachings and component parts covered in my copending application for patent, Ser. No. 651,922 filed Jan. 23, 1976 (now abandoned).

The field of atmospherics is almost totally void of systems or concepts designed to deal with the general problem area as a whole. Approaches toward dealing with the problem have been limited to concern over lightning and hail, respectively, and the dispensing of chaff or silver iodide crystals into the atmosphere as a prevention measure; or, at the other end of the application spectrum, the use of haphazardly located lightning rods as a remedial measure to deal with just one specific manifestation, namely, lightning.

The chaff and silver iodide crystals concepts were devised to deal directly with the cloud cells and were dispensed directly into the clouds from an overflying aircraft. The chaff was devised to deal with the electrical manifestations of the storm from within, while the silver iodide salting technique was devised to deal with the mechanical forces of the storm.

The use of such equipment as lightning rods was established to deal with lightning only, one electrical manifestation of atmospherics as it impacts the earthbound facilities within its sphere of influence. Originally it was thought that the lightning rod served to release and neutralize, selectively, the charge on a cloud at a relatively slow rate. However, the fact that lightning rods were struck frequently led to the realization that although lightning rods did leak off some current, a lightning rod soon reached saturation under prestroke conditions resulting in a breakdown at the point and a subsequent upward moving streamer which joined with the lightning leader already moving toward earth. The result is a deluge of current, of a magnitude of 20 coulombs on the average, flowing into the rod and through the grounding system, all in a very short period of time. Accompanying this discharge are both electrostatic and electromagnetic atmospheric disturbances.

It is plausible that a preventative protection mode can be made effective through the provision of a plurality of adequately devised neutralizing elements together with an appropriate charge collector and an interconnecting system. This invention presents the respective improvements required to accomplish this objective. However, it should first be recognized that there have been several other attempts made to achieve this objective. At least five prior patents are known awarded to inventions in this field. All of these were based on the "point discharge" principle. None of them recognized most of the factors influencing operational effectiveness. These prior patents include: A U.S. Pat. No. 1,743,526, dated Jan. 14, 1930; an Austrian Pat. No. 138,190, dated May 27, 1933; a German Pat. No. 264,571, dated in 1913; a British Pat. No. 294,183, dated in 1929; and a British Pat. No. 338,268, dated in 1930. The most comprehensive of these, the U.S. Patent, is used as a basis of comparison to illustrate the commonalities and differences, respectively. All five patents were based on the "point discharge" principle as is this invention. However, in contrast to these others, this invention takes into account also all the other factors that influence the performance of a multipoint dissipator to make it a successful system for atmospherics conditioning.

SUMMARY OF INVENTION

The subject of this invention is a protection system having preventative characteristics. This is accomplished through the provision of a plurality of adequately devised and strategically positioned neutralizing elements, a ground current collector circuit and inter-connecting wiring connecting the former with the latter.

This invention was developed to provide any earth associated body, structure or facility with protection against the deleterious effects of atmospheric electricity commonly known as atmospherics. The system concept is preventative in that it deals with the cause rather than the resulting manifestations. In principle, it is applicable to any situation, facility and location on earth, and any facility configuration, respectively. The specific applications take various forms since they are designed to satisfy not only the protection requirement, but also to avoid compromising either the esthetics or the performance of the facility it is designed to protect.

Atmospheric electricity produces four effects considered deleterious according to contemporary technology. These effects include: (a) Cloud-to-cloud and cloud-to-earth discharges, commonly known as lightning; (b) electrostatic field transients created by these discharges; (c) earth current transients created by discharges to earth and (d) electromagnetic field transients resulting from the high current flows within the lightning channel itself. This invention deals with all four of these phenomena by reducing fields created by the charged clouds, by significantly reducing the charge induced into the earth by the cloud's electrostatic field, by reducing the potential difference between the site and the cloud cells and by isolating the site from the charged clouds with an ion screen. By reducing the electrical charge it also holds promise of reducing or eliminating the hail producing capability of these clouds.

Further advantages of the subject improvements over prior art will become apparent from the following description and the accompanying drawing wherein like reference characters designate like or corresponding parts.

In the drawing, forming a part of this application:

FIG. 1 is a schematic view, in front elevation, of a charged cloud influence on facilities located on the surface of the earth, indicating possible and typical polarities of the prevailing electric charges;

FIG. 2 presents the equivalent electrical circuit for the example conditions shown in FIG. 1, with the corresponding electrical charge polarities;

FIG. 3 illustrates, in a schematic view and in front elevation, a dissipation array in operation in accordance with this invention and containing the then prevailing electrical charge polarities;

FIG. 4 indicates, schematically and in front elevation, the operational characteristics of a hemispherically-shaped ionizer;

FIG. 5 shows, schematically and in front elevation, the operational characteristics of a trapezoidally-shaped ionizer;

FIG. 6 presents the applicable geometry for the calculation of the performance of the ionizer type shown in FIG. 4;

FIG. 7 indicates the applicable geometry for the calculation of the performance of the ionizer type shown in FIG. 5;

FIG. 8 is a schematic view, in the direction of the arrow "A" in FIG. 7, of a possible dissipator assembly array;

FIG. 9 portrays, in front elevation, a dissipator assembly having dissipator members joined to a base conductor;

FIG. 11 shows, in front elevation, a dissipator assembly having dissipator members formed from severed strands of a stranded wire type base conductor;

Figure 14:
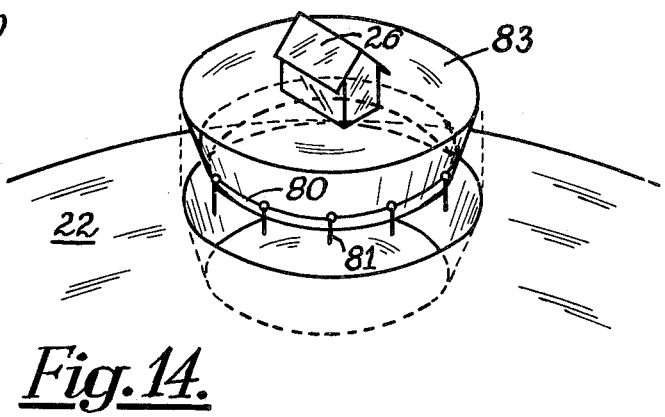
Figure 15:
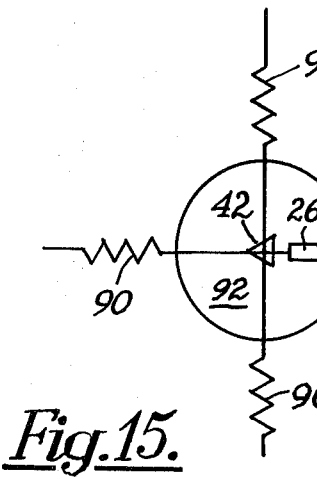
Figure 12:
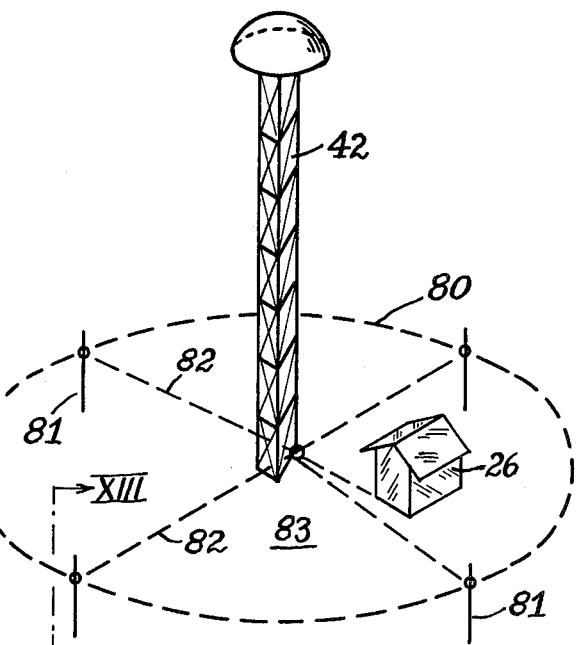
FIG. 12 is a schematic, isometric view of the ground current collector system.

FIG. 14 portrays, in a schematic, isometric and exploded view, the floating ground current collector principle employed in this invention, and FIG. 15 is the equivalent electric circuit diagram for the arrangement shown in FIG. 12.

To explain how the concept functions it is first necessary to describe the situation with which it is confronted. Little is known of the mechanisms which create atmospheric electricity and which lead to the static discharge known as lightning. However, for the purpose of providing protection against and an assessment of the resulting phenomena, respectively, the knowledge of the creating forces is not required. It is, however, necessary to understand the resulting situation and its manifestations as it exists prior to and during the storm periods. As for this requirement, the available data is quite extensive and in general agreement.

Figure 1:
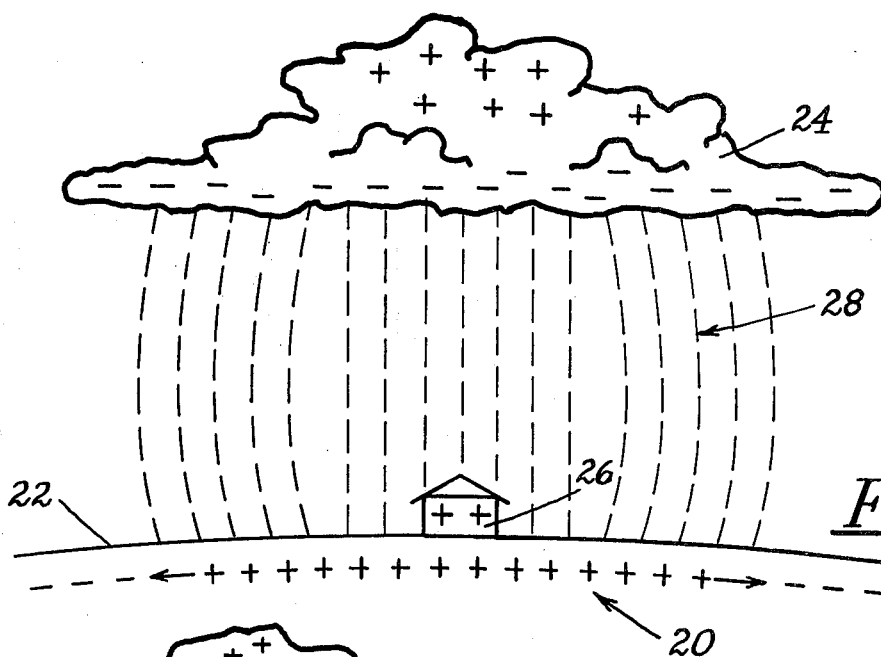

The thunderheads are electrically charged bodies suspended in an atmosphere that may be considered, at best, a poor conductor. During a storm situation the charge will continue to build up within the cloud until the field strength reaches a point where the insulation quality of the air gap is no longer effective and breakdown takes place. The specific breakdown point varies with atmospheric conditions. It is generally taken as 3 kilovolt per centimeter for negatively charged storm cells and 5 kilovolt per centimeter for positively charged cells. The charging action or charge separation within the storm cell usually leaves the base of the cloud with a strong negative charge. In about ten percent of the cases the opposite seems true. This resulting charge induces a similar charge of opposite potential into the earth as illustrated by FIG. 1. The charge center 20 is concentrated on the earth's surface 22, just under the cloud 24 and of the same size and shape as the cloud 24. As structures 26 intervene between the earth and cells they are likewise charged shorting out a portion of the separating air space 28. The ultimate result can be either a triggered strike because of the reduced air space or because it was high enough to start an upwardly moving leader.

Figure 2:
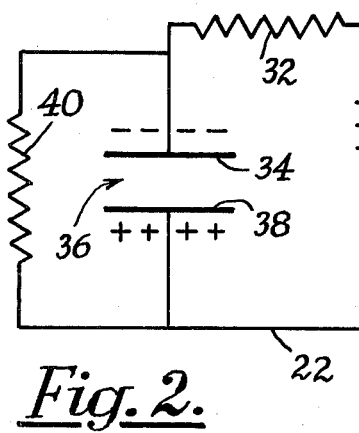

The equivalent electrical circuit for this phenomenon is presented in simplified form by FIG. 2. The cloud mechanism is represented by a very high voltage source 30, a first resistor 32 and one plate 34 of a capacitor 36. The value of the circuit elements vary from cloud to cloud and establish the recharge time. The other plate 38 of the capacitor 36 is provided by the earth surface 22 directly beneath the cloud (not shown in FIG. 2). The free ions in the air created by natural dissipation are represented by the single second resistor 40 across the gap of the capacitor 36. These ions constitute the current flow from the earth 22.

The foremost objective of the invention is to reduce the electrostatic potential between the area or facility of concern and the passing cloud cells to a level where the ongoing atmospherics induce no deleterious effects into the facilities of concern. Some of these effects include, but are not limited to: direct lightning strikes, or transients induced thereinto, communications circuits, meteorology sensors, process control equipment, status sensors, power transmission and distribution lines, telephone circuits, switchgear, substations, FM and AM radio stations, television, cable television, microwave and other like sensitive power and electronic equipment. This invention also eliminates the bound charge phenomena associated with, for example, petrochemical storage and processing facilities.

The lightning strikes, or flashes, are created when a cloud potential exceeds the breakdown potential of the surrounding air. As a result, a step leader is formed and moves rapidly earthward meeting an upward moving leader a short way above the earth. The deleterious transients are created by either the rapid change in the elecrostatic field created by these discharges or by the rapid movement of the earth charge from the point where it was induced into the earth to the point where the lightning strike terminated. This invention eliminates or minimizes and, in many cases, eliminates the root cause of these phenomena by significantly reducing and suppressing, respectively, the electrostatic field and conducting the charge away from the area of concern.

Figure 3:
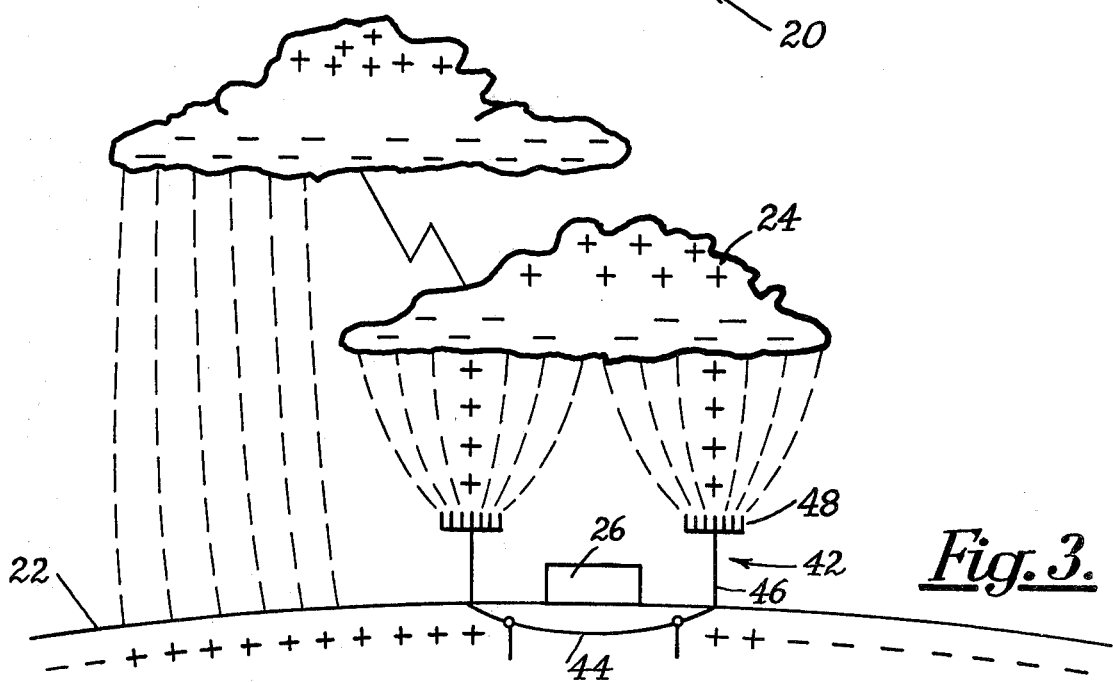

The invention is composed of three basic elements as illustrated in FIG. 3 for one possible configuration: at least one ionizer 42, a ground current collector 44, and the correlated system connections 46.

The ionizer 42, which is in essence a space charge generator, is an array of dissipator elements designed to produce an abundance of air ions through use of the point discharge effect, a well known physical phenomena, without encouraging the formation of an upward going leader. The ionizer 42 is designed, oriented, located and elevated in such a way as to take maximum advantage of the electrostatic field produced by any charged clouds in the area as the motivating force. The factors to be considered in the ionizer design include: field orientation, elevation, potential wind velocity, shape, size and character of the individual dissipator elements shown in FIGS. 9, 10 and 11 for selective installations 48 on the respective ionizers 42. All these factors significantly influence system performance, many of which were ignored in prior art. These ionizer design factors influence performance in the following manner:

(1) The field generated by any storm must impinge on as much of the ionizer area as possible; regardless of the direction from which it comes, the size of the storm cell, its elevation with respect to the average cloud base, or whether it builds up locally or moves in from any other adjacent area.

(2) The ionizer must be elevated to the highest practical level. The higher it is elevated the greater the ion current flow. The ion current flow is exponentially related to the field established by the storm cells and is directly related to the height of the ionizer above the surroundings, not just above the earth. Vegetation and other nearby structures tend to elevate the zero potential line and lower the difference of potential between the ionizer and the surrounding air; if they are at the same height, the ionizer will be ineffective.

(3) The potential wind velocity must be taken into account since ion mobility is directly related to wind speed. The faster the ion flows, the higher the ion current. However, the faster wind speeds tend to distort the protected envelope in a downwind direction in consonance with wind velocity. The result can be unprotected areas on the upwind side. As a result, prevailing wind conditions must be considered in the design and the array must be located, oriented or configured to compensate for wind effects.

(4) The ionizer shape must be configured such that the face is always parallel with the lines of equal potential as generated by the storm and that the maximum number of individual dissipators are touched by the same potential line. Extreme caution must be taken to prevent enhancement or reenforcement of these lines at any single point on the ionizer. Conversely, they must form evenly over the entire ionizer face 50, as shown in FIG. 4. The known prior art failed because of the disregard of this factor alone. The principle is illustrated by both FIGS. 4 and 5, where two typical situations are presented. The lines are equal potential 52 form around the ionizer face 50 in FIG. 4 and the face 51 in FIG. 5, respectively, so that they are parallel to the face and, as a result, the lines of force 52 are always at or near perpendicular with respect to the plane of the ionizer 50 and 51, respectively. There must be no sharp transitions or bends when the lines 52 of equal potential are interfacing with the ionizer 50 and 51, respectively, otherwise the formation of an upward going leader will be encouraged and create weakness in the system.

(5) The ionizer size controls the area of protection; however, this is also related to the height at which it is deployed. These relationships are illustrated by FIGS. 6 and 7 in each of which one typical ionizer configuration is presented with its approximate area of protection, expressed in probabilistic, percentile terms. It should be noted that the size of the protected area increases directly with an increase in the ionizer area and its height.

The scope of protection of an array is somewhat probabilistic in nature. This is due to wind influence and variations in storm character. However, the scope of coverage can be estimated with reasonable accuracy.

With reference to FIG. 6, whereon is illustrated the application of a typical hemisphere array for the protection of tall towers and their surrounding area, the scope of protection for this array can be approximated to a percentile probability value by using the following relationship in conjunction with FIG. 6. r, the radius of the array as measured from the centerline of the ionizer, is approximately equal to:

$$r = (hd/30)$$

where: h is the height, expressed in feet, of the ionizer 50 above the average foliage or local terrain height; d, expressed in feet, is the diameter 60 of the ionizer in plan view and 30 is an experimentally observed constant distance expressed in feet. The 32 degree angular slope defines the approximate limit for the 0.999 percentile area of protection; the 46 degree angular slope defines the approximate limit for the 0.99 percentile area of protection; and, the 68 degree angular slope defines the approximate limit for the 0.95 percentile area of protection. It should be noted that the angles of 32, 46 and 68 degrees, respectively, are not depicted in their actual magnitudes.

With reference to FIG. 7, whereon is illustrated the application criteria for a typical trapezoid array, the scope of protection for this form of array is related to different physical factors. First, the area within the angle formed by the ionizer face 51 with respect to the tower is completey protected. Of greater concern in some applications is the scope of protection above the ionizer superstructure $h_3$ having a metal sphere and a comparable structure, selectively, at its top to limit emission of charges into the atmosphere ($h_3$). This can best be approximated by the following expression:

$$h_3 = \left[ \frac{h_1 + \frac{h_2}{2} - 30}{P} \right] \left[ \frac{A}{300} \right]$$

where: $h_2$ is the horizontal projection of the ionizer length expressed in feet; $h_1$ is the height, expressed in feet, of the ionizer base above the average local vegetation or terrain, whichever is highest; A is the area of the trapezoid face 51 of FIG. 8; 300 is an experimentally observed constant area expressed in square feet and, the percentile probability factor P is about 6 for 0.999 probability of protection, 5.5 for 0.99 probability of protection and 4.9 for 0.95 probability of protection.

Figure 9:
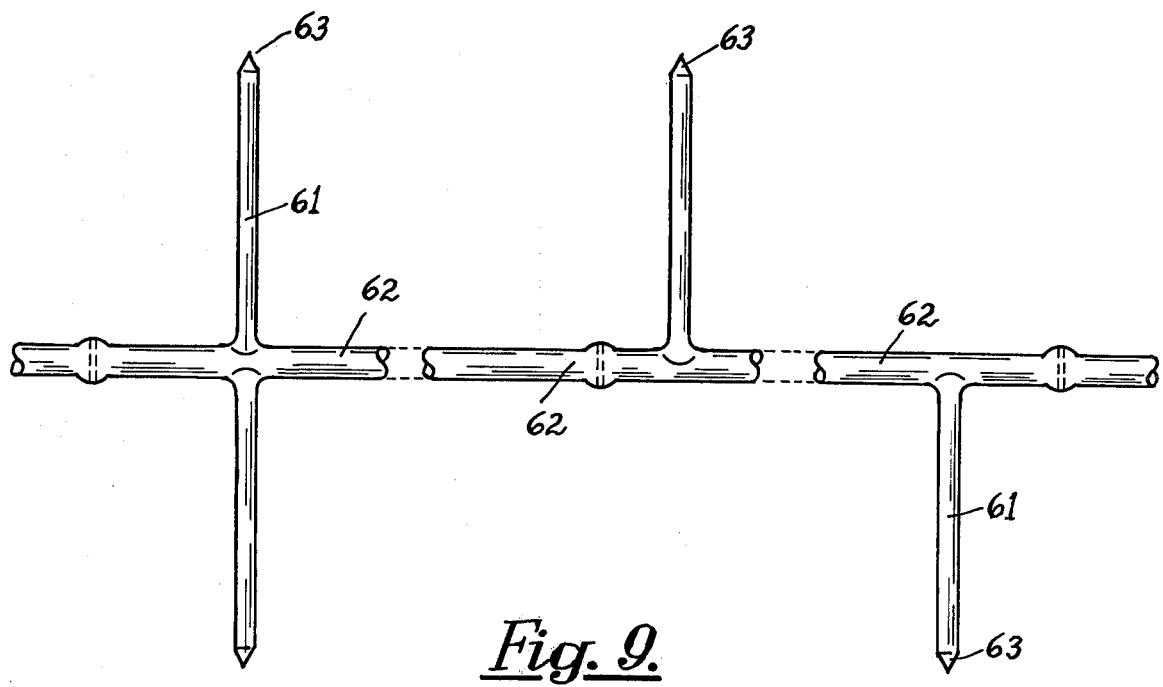
Figure 10:
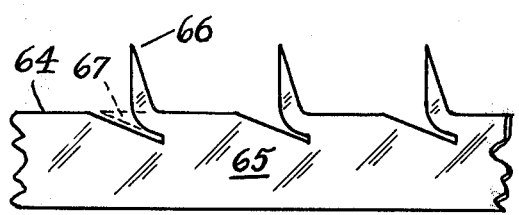
FIG. 10 shows, in front elevation, a dissipator assembly having dissipator members formed integrally from a base conductor.
Figure 13:
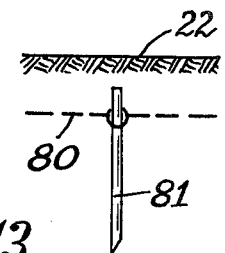
FIG. 13 shows, schematically, a typical union between the ground current collector wire and a rod, viewed in the plane "XIII—XIII" of FIG. 12.

(6) The characteristics of the individual dissipator elements markedly influence the dissipation current by several orders of magnitude. FIGS. 9, 10 and 11 each illustrate a different possible form of dissipator element that may be used for the top surface configuration of ionizers of, for example, the ionizer having the diameter 60 in FIG. 6, the ionizer 50 in FIG. 4 and the ionizer 51 in FIG. 8, depending on prevailing requirements and conditions.

Dissipator assemblies known in the art consist of a base conductor upon which the actual dissipator members are mounted in discrete, predetermined distances from each other. Each said dissipator member consists of a comparatively short length of an electrically conductive, preferably metallic, material and each of its two ends is formed so as to terminate in a substantially conical shape having a sharp-pointed apex. The installation of said dissipator members on the base conductor is performed, for example, through winding of the former around the latter with, say, two to four turns and under considerable tension so that the resulting pressure of the turns about the base conductor provides good electrical conductivity between and across the surface of each said dissipator member and the surface of said base conductor. Suitable coatings are applied to said assemblies to make them resistant to environmental effects and to impart a pleasant appearance, respectively.

The major disadvantage to those dissipator assemblies of prior art is the contact discontinuity which may exist between each said ionizer member and said base conductor, and the lack of attention accorded the effect.

Another, considerable disadvantage is the comparatively short dissipator members which are of limited effectiveness; former designs were two short to produce enough free ions.

The new dissipator assemblies according to this invention overcome the aforementioned, unfavorable circumstances—per se—and through new and more economical manufacturing techniques.

One embodiment, shown in FIG. 9, is fabricated through welding of dissipator members 61 to a cylindrical base conductor 62 at a horizontal distance from each other equal to two times a dissipator member height. The height is normally set at 10 centimeters but may be varied to fit the circumstances. In addition thereto, the substantially conically-shaped and pointed end of each said dissipator member 61 is formed into an extremely sharp apex of substantially conically-shaped point 63 thus providing a superior ionization capability over former art.

Another embodiment shown in FIG. 10 is made from metal strip stock, constituting the base conductor 65. The ionizer members 67 are formed from and along one edge 64 of the strip 65, partly through shearing off a length of 10 centimeters and width from the strip material at approximately 10 centimeters distances from each other. The free end 66 of each so produced ionizer member 67 is severed so as to leave an extremely sharp conically-shaped top 66 for each ionizer member.

Yet another dissipator species illustrated in FIG. 11, consists of a stranded wire 70 being the base conductor. At discrete distances from each other a specific strand 71 is cut apart at a location at the surface of said stranded wire 70. One of the now available two ends is turned outwardly and equipped with a pointed end 72 in a manner described in the foregoing two ionizer assemblies. Shapings and heights may be varied for any of the embodiments to fit other criteria, but those shown seem to be best for most applications.

Coatings of zinc and magnesium, selectively, are applied in a manner well known in the art to the surface of any of the dissipators species to enhance the liberation of free ions.

The ground current collector hereinafter called GCC is, in contrast to the former art of grounding, one of the significant improvements in this invention. The GCC is designed to selectively provide an electrically isolated or a floating ground subsystem for the protected area with respect to the earth or mother earth itself. Since the induced charge created by the storm is at the earth surface, that portion of the earth's surface containing the facilities to be protected is surrounded with the GCC, as illustrated by FIG. 12. It is composed of the ground current collector wire 80 buried to a depth of about 25 centimeters and the short, about 1 meter long rods 81 connected at one end with the GCC wire 80, which are spaced at intervals of about 10 meters. The enclosed area is further integrated by a net of cross conductors 82 which also connect surface structures 26 and ionizers 42 with the system. The cumulative resultant is an electrical, integrated island 83 surrounded by and isolated from the less conductive soil. The short rods 81 give the island 83 enough depth to assure collection of any charge induced within the area of concern. The overall result is an electrically floating island extending to the protected area and isolating it from its less conductive surroundings. It functions as follows: as the charge moves into the area, it first interfaces with the GCC which provides a preferred path for the charge from this point of interface to the ionizer assembly, by means of the service wires, thus essentially bypassing the protected area. As schematically portrayed in FIG. 15, the current flow 91 thus created through the surrounding surface soil only, causes a voltage drop across that soil resistances 90 as illustrated by the equivalent circuit of FIG. 15, such that the electrically isolated island 92 established by the GCC, is reduced to a lower potential than its surroundings.

The serivce wires 82 function only to provide a direct, low-resistance path from the GCC to the ionizer. In contrast to prior art, these wires are designed to carry low current levels over the shortest path and are selected more for stuctural integrity than for current carrying capacity, the current flow being in the milliampere range.

The significance of the electrically isolated island is expressed in the exploded view of FIG. 14.

Having described the functions of the invention, its novel and advantageous effects present themselves as follows:

(a) The current flow from the ionizer, through the air space above it, reduces the potential of the protected site and facility, selectively, with respect to its surroundings, as indicated by the lines of equal potential of FIG. 3.

(b) The presence of free ions or space charge between the protected site and facility, respectively, and the cloud structure form a type of Faraday shield between them, thus isolating the facility from much of the storm influence.

(c) The cloud potential is reduced by those ions reaching them, thus neutralizing some portion of its overall charge.

(d) The potential of the site and facility, respectively, with respect to its surroundings, is lowered due to the current flow through the surrounding earth area leading up to the electrically isolated protected area; and the attendant IR drop across that area. Where the potential of the site and facility, selectively, is significantly lowered with respect to its surroundings and the charged clouds, that site and facility, selectively, is isolated from and protected against the atmospherics created by that charged cloud and storm system, respectively.

It becomes apparent that the herein expounded principle of the atmospherics conditioning system and the, however typical, equipment embodiments can be applied to the protection of numerous object configurations and types, varying from each other from the point of utility, structural design and inherent hazards. Thusly, the preventative system is suitable for the protection of power transmission and distribution lines, electric substations, oil storage and processing facilities, broadcast, television and other communication and control towers, residential and industrial buildings, amusement facilities and school complexes, to mention but a few applications. It is obvious that the elements of the herein described system, namely, the ionizer, the ground current collector and the system connections will require modification as to the quantity of elements, their dimensions and their positions to conform to the protective needs of the particular object layout, location and environmental conditions. It is however, understood that these modifications can be performed on the basis of the herein disclosed teachings and by those familiar with this art and that such modifications do not depart from the spirit of this invention.

What is claimed is:

1. A system and equipment for atmospherics conditioning of objects located on the earth's surface to protect them from the effects of atmospherics which are to include but not be limited to such phenomena as lightning, electrostatic fields, electromagnetic fields, field transients, static charge, hail and any other related phenomena
comprising:
at least one discrete ionizer structure rising above the earth's surface and the to be protected objects, selectively, extending upwardly to a specific elevation calculable for the at least one specific intended area of protection provided by a said discrete ionizer structure under a uniform field shape, avoiding field reinforcing at any point,
an endless ground current collector structure having at least one downwardly extending grounded charge collecting rod and disposed horizontally about the base of said discrete ionizer structure and contiguous to the earth's surface, so as to surround the to be protected objects on the earth's surface and thereby establishing an electrically floating island having the area of said calculable intended protection and
a plurality of service wires connecting the base of a said discrete ionizer structure with operationally significant points of said ground collector structure and those of objects on the earth's surface and located within the perimeter of said endless ground current collector structure, selectively.

2. A system and equipment for atmospherics conditioning as defined in claim 1, wherein
each said ionizer structure is equipped with a plurality of dissipator elements having a geometry calculable so as to form the lines of equal potential around the ionizer structure and commensurate with at least one calculable intended area of protection.

3. A system and equipment for atmospherics conditioning as defined in claim 2,
wherein
each said dissipator element is affixed to and formed from a base conductor, selectively, extending perpendicularly from and for a length of approximately 10 centimeters from said base conductor and spaced apart from each other for a distance of 10 centimeters between adjacent dissipator elements and coated with zinc and magnesium, selectively, to promote and optimize active ionization.

* * * * *